2,906,727
CLOROETHYLENE POLYMER AND DI-9-FLUO- RENYL ETHERS OR DIBENZHYDRYL ETHERS

David A. Gordon, Midland, Mich., assignor to The Dow Chemical Company, Midland, Mich., a corporation of Delaware No Drawing. Application May 11, 1956
Serial No. 584,164

7 Claims. (Cl. 260—45.7)

This invention relates to the thermal stabilization of haloethylene polymers. More particularly it relates to new compositions based on haloethylene polymers having improved thermal stability over the prior known compositions.

It is known that haloethylene polymers, such as polyvinyl chloride and the copolymers of vinyl chloride and vinylidene chloride, undergo appreciable degradation and darkening when heated during thermal fabrication operations and when the fabricated articles are exposed for prolonged periods to elevated temperatures. Such thermal sensitivity has seriously limited the applications in which haloethylene polymers may be employed. One of the common means for alleviating that degradation has been to employ certain additives as heat stabilizers in the polymer formulations. Those additives have consisted commonly of inorganic salts, such as tetrasodium phyrophosphate, which frequently were incompatible with the polymer prohibiting the production of transparent articles, were high melting causing slubs in the articles and lower fabrication efficiencies, and were hygroscopic causing gassing during fabrication. Other heat stabilizers that were employed were organo-metallic compounds which were expensive and difficult to prepare and in some instances caused degradation of the plasticizers used in the formulation. The requirements of a suitable heat stabilizer can be seen to be manifold and varied. It must be compatible with and inert to all elements of the formulation. It must be odor-free and not impart a color to the formulation. It is desirable that it be non-toxic and tasteless. It should be insoluble in water and the common household solvents. In view of those many requirements, it is impossible for an investigator to predict the effectiveness of any particular compound as a stabilizer with any degree of certainty, and continuous search is being made for new and more effective heat stabilizers.

It is accordingly an object of this invention to provide a novel heat stabilized composition based upon haloethylene polymers.

It is a further object to provide such compositions which are thermally stabilized with metal-free organic stabilizers.

The above and related objects are achieved with a composition comprising a haloethylene polymer and stabilizing quantities of an ether selected from the group consisting of benzhydryl ethers and fluorenyl ethers. The terms benzhydryl ethers and fluorenyl ethers for purposes of this application are meant to include both the parent ethers as well as those containing substituents, such as alkyl, alkoxy, and halogen, which are inert to the usual elements in polymer formulations. Compositions thus prepared show outstanding stability to the degradative effects of elevated temperatures.

Any polymer containing halide groups in the carbon chain may be stabilized with the ethers of this invention. As typical examples may be mentioned the polymers of vinyl chloride and vinylidene chloride and the copolymers of vinyl chloride and vinylidene chloride with each other or with another monoethylenically unsaturated monomer, such as acrylonitrile and vinyl acetate. The polymers and copolymers consisting predominantly of vinylidene chloride are particularly sensitive to thermal exposure and are accordingly preferred in these compositions.

The stabilizers useful in the compositions of this invention are those having a parent nucleus of dibenzhydryl and difluorenyl ethers. The ethers may be nuclearly substituted on the aromatic groups with substituents which are inert to all of the elements of the polymer formulation. Although any number of substituents up to 5 for each phenyl group in the benzhydryl series and up to 4 for each aromatic group in the fluorenyl series may be used without loss of stabilizing effectiveness, the number of substituents actually used will usually not exceed 1 for each group for economic and practical reasons.

Typical members of useful stabilizers falling within the scope of the invention are:

dibenzhydryl ether
di-9-fluorenyl ether
bis(p-Bromo-alpha-phenylbenzyl) ether
bis(bis(p-Chlorophenyl) methyl) ether
bis (di-p-Tolylmethyl) ether
bis(p-Methoxyphenyl, phenyl methyl) ether The preparation of the compounds will be illustrated by the preparation of dibenzhydryl ether. Benzhydrol and 0.1 percent of its weight of p-toluenesulfonic acid catalyst were refluxed while removing the water formed with a Dean-Stark trap. When the reaction was complete as indicated by no further water formed, the solution of product was filtered hot and the filtrate cooled with stirring. The product crystallized as a white crystalline solid which after one recrystallization from methylcyclohexane yielded the dibenzhydryl ether having a melting point of 109–110° C.

The ethers of this invention show stabilizing effectiveness when used in an amount of from 1 to 10 percent of the weight of the polymer. It is preferred, however, to employ them in an amount of from 1 to 5 percent by weight. When more than 5 percent is used, the stabilizers become economically unattractive, no additional benefits accrue, and the physical properties of articles made from the composition suffer.

The ethers of this invention are colorless, odorless, tasteless and non-toxic. Thus, white, pastel-colored, and transparent articles may be prepared without their appearance being affected by the stabilizer. Also, the articles prepared from such compositions are more merchandisable than many of the known compositions due to the freedom from odor, taste, exudation or leaching of the heat stabilizer. Because of their completely organic nature the ethers are capable of greater compatibility with the polymers than inorganic or organo-metallic stabilizers heretofore used. Additionally the ethers show greater stabilizing effectiveness toward compositions based upon haloethylene polymers than any previously known completely organic stabilizer.

The stabilizers of this invention may be employed with the other common additives used in haloethylene polymer formulations without any adverse effects resulting therefrom. Typical of such other additives are light stabilizers, fillers, pigments, and dyes.

The effectiveness and advantages of the ethers of this invention will be more apparent from the following illustrative examples wherein all parts and percentages are by weight.

EXAMPLE 1

Several samples were prepared from a basic formulation consisting of 88.15 parts of a copolymer prepared from 85 percent vinylidene chloride and 15 parts of vinyl chloride, 6 parts of a tetraester of pentaerythritol (ave. chain length=6), 1 part of dibenzoyl resorcinol as a light stabilizer, 0.3 part citric acid and 0.05 part maleic anhydride as a color stabilizer, 0.5 part of a lubricant, and 1 part of titanium dioxide. One of the samples was used as a control and to the others were added varying amounts of stabilizers. One sample was stabilized with bis(alpha-methyl-benzyl) ether, one with an epoxidized glyceride sold commercially as Paraplex G-60 by the Rohm and Haas Company, one with an inorganic phosphate combination known to be an effective heat stabilizer for haloethylene polymers, and one with a dibenzhydryl ether of this invention. The samples were all evaluated according to a standard test. In that test a sample of at least 20 grams of the formulation is subjected to a temperature of 178° C. and the pressure of the evolved hydrohalide gas is used to determine the degree of thermal degradation. The results are relative to a standard and are reported as "T" values, which are the times required for the samples to reach an arbitrary rate of pressure rise. Thus, a more thermally stable composition will have a higher "T" value than a less stable composition. The results are listed in Table I.

*Table I*

| Stabilizer | Parts added | "T" value |
|---|---|---|
| None | | 8 |
| Bis(alpha-methylbenzyl) ether | 3 | 11 |
| Epoxidized glyceride | 1 | 7 |
| Sodium tripolyphosphate | 0.5 | } 11 |
| Disodium lauryl phosphate | 0.5 | |
| Dibenzhydryl ether | 3 | 13 |

As can be seen the compositions containing the dibenzhydryl ether are thermally more stable as compositions containing the other prior known stabilizers.

EXAMPLE 2

Additional samples were prepared from the same polymer as in Example 1. The light stabilizer used was t-butylphenyl salicylate and the plasticizer was ethyl phthalyl ethyl glycollate. Some of the samples were stabilized with the ethers of this invention, some with bis(alpha - methylbenzyl) ether, some with 1 - (o - biphenylyloxy) - 2,3 - epoxypropane, and some with an epoxidized glyceride sold commercially by the Rohm and Haas Co. as Paraplex G-60. Each of the latter three compounds is a compound known to have some effectiveness as a thermal stabilizer for haloethylene polymers. The samples were subjected to the standard thermal degradation test described in Example 1 and the results are reported in Table II.

*Table II*

| Stabilizer | Parts | Parts polymer | Parts light stabilizer | Parts plasticizer | "T" value |
|---|---|---|---|---|---|
| None | | 95 | | 5 | 5.0 |
| Do | | 94.5 | 2.5 | 3 | 6.0 |
| Bis (alpha - methylbenzyl) ether | 3 | 92 | | 5 | 11.0 |
| 1 - (o - biphenylyloxy) - 2, 3 - epoxypropane | 3 | 92 | | 5 | 13.0 |
| Epoxidized glyceride | 1 | 94 | | 5 | 9.5 |
| Ethers of this invention: | | | | | |
| Dibenzhydryl ether | 3 | 92 | | 5 | 15.5 |
| Bis (p - bromo - alpha - phenyl-benzyl) ether | 3 | 91.5 | 2.5 | 3 | 12.0 |
| Bis(bis(p-chlorophenyl) methyl) ether | 2 | 91 | 2 | 4 | 12 |
| Bis (di - p - tolylmethyl) ether | 2 | 91 | 2 | 4 | 18 |
| Di-9-fluorenyl ether | 2 | 91 | 2 | 4 | 12 |

The results indicate that the stabilizers of this invention are as effective in stabilizing the polymer as commercially used substances.

Similar results are observed when the ethers are employed as stabilizers in compositions based on the polymer and copolymers of vinyl chloride.

I claim:

1. A thermally stable composition comprising a chloroethylene polymer and from 1 to 10 percent of an ether selected from the group consisting of dibenzhydryl ether, di-9-fluorenyl ether, and a dibenzhydryl ether having a nuclear substituent on the phenyl groups, said nuclear substituents being selected from the group consisting of alkyl having not more than 8 carbon atoms, alkoxy having not more than 8 carbon atoms and a halogen.

2. The composition claimed in claim 1 wherein said chloroethylene polymer is a copolymer composed predominantly of vinylidene chloride with any remainder being of a monoethylenically unsaturated comonomer.

3. The composition claimed in claim 1 wherein said ether is dibenzhydryl ether.

4. The composition claimed in claim 1 wherein said ether is bis(p-methoxyphenyl, phenyl methyl) ether.

5. The composition claimed in claim 1 wherein said ether is bis(bis(p-chlorophenyl) methyl) ether.

6. The composition claimed in claim 1 wherein said ether is bis(di-p-tolylmethyl) ether.

7. The composition claimed in claim 1 wherein said ether is di-9-fluorenyl ether.

References Cited in the file of this patent
UNITED STATES PATENTS
2,371,618    Hanson et al. _____ Mar. 20, 1945
FOREIGN PATENTS
455,527    Canada _____ Mar. 29, 1949
OTHER REFERENCES
Pratt et al.: J. Am. Chem. Soc., 71, 2846-9 (1949).
Whittig et al.: Ann., 562, 192-205 (1949).